(12) United States Patent
Yang (10) Patent No.: US 10,622,591 B2
(45) Date of Patent: Apr. 14, 2020

(54) BATTERY CONTAINER

(71) Applicants: Prologium Technology Co., Ltd., New Taipei (TW); Prologium Holding Inc., Grand Cayman (KY)

(72) Inventor: Szu-Nan Yang, New Taipei (TW)

(73) Assignees: PROLOGIUM TECHNOLOGY CO., LTD., New Taipei (TW); PROLOGIUM HOLDING INC., Grand Cayman (KY)

( * ) Notice: Subject to any disclaimer, the term of this patent is extended or adjusted under 35 U.S.C. 154(b) by 96 days.

(21) Appl. No.: 15/450,251

(22) Filed: Mar. 6, 2017

(65) Prior Publication Data

US 2017/0256755 A1 Sep. 7, 2017

(30) Foreign Application Priority Data

Mar. 7, 2016 (TW) .............................. 105106842 A (51) Int. Cl.
*H01M 2/02* (2006.01)
*H01M 10/04* (2006.01)
*H01M 2/16* (2006.01)

(52) U.S. Cl.
CPC ........... *H01M 2/021* (2013.01); *H01M 2/028* (2013.01); *H01M 2/0275* (2013.01); *H01M 2/164* (2013.01); *H01M 10/0436* (2013.01); *H01M 2220/30* (2013.01)

(58) Field of Classification Search
CPC ........ H01M 2/00; H01M 2/0275; H01M 2/02; H01M 2/0207
See application file for complete search history.

(56) References Cited

U.S. PATENT DOCUMENTS

| | | | |
|---|---|---|---|
| 5,432,027 A | 7/1995 | Tuttle et al. | |
| 6,599,659 B1 * | 7/2003 | Endo | H01M 2/021 29/623.2 |
| 9,741,977 B2 * | 8/2017 | Yi | H01M 2/0275 |
| 2009/0117412 A1 * | 5/2009 | Koh | H01M 2/0473 429/7 |
| 2012/0121963 A1 * | 5/2012 | Kwon | H01M 2/0275 429/127 |

(Continued)

FOREIGN PATENT DOCUMENTS

| | | |
|---|---|---|
| TW | 299509 | 3/1997 |
| TW | 201530853 A | 8/2015 |

*Primary Examiner* — Matthew J Merkling
(74) *Attorney, Agent, or Firm* — Rabin & Berdo, P.C.

(57) ABSTRACT

A battery container includes a flexible pack including an accommodation region; and at least one reservation region substantially connected to the accommodation region; and a battery set that is bent and disposed within the accommodation region, and that has two ends, at least one end forming a fan-shaped end after bending, and being disposed within one reservation region, and that includes a plurality of battery cells that are stacked and electrically connected; at least one friction-reducing layer disposed on at least one surface of each battery cell; and at least one fixing element that fixes the plurality of battery cells to one another, wherein the two ends have respective shapes that are due to different deformations of each battery cell of the plurality of battery cells as the flexible pack and the battery set are bent. Structural integrity, safety and bending ability of the battery set is greatly improved.

16 Claims, 7 Drawing Sheets

(56) References Cited

U.S. PATENT DOCUMENTS

2016/0149171 A1* 5/2016 Suh .................. H01M 2/021
                                                                        429/163
2016/0276635 A1   9/2016 Ju et al.

* cited by examiner

BATTERY CONTAINER

BACKGROUND

1. Technical Field

The present invention is related to a device exerted for a battery, especially related to a battery container exerted for a flexible battery.

2. Description of Related Art

The portable devices are widely developed based on the convenience demands. Take the wearable device as an example, except for the size, shape and energy density of the battery, the safety and the bending ability of the battery are required exceedingly.

Conventionally, the battery cells are placed into a flexible case having at least one chamber so the frictions acted on the surfaces among battery cells and on the surfaces between the case and the battery cell are inevitable as the case having the battery inside is bent. The frictions acted on the surfaces among battery cells and on the surfaces between the case and the battery cell are severe especially as several battery cells are stacked and bent at the same time. One reason is that the end of the stacked battery cells would be extended as a fan-shaped end. However, the flexible case has no enough space for placing the fan-shaped end of the battery cells as bending. Thus, the structural integrity and the safety of the battery cells are impacted.

Accordingly, a battery container is disclosed to solve the current problems.

SUMMARY OF THE INVENTION

The present invention is to provide a battery container, which can improve the integrity, safety and bending ability via the frictionless layer disposed among the battery cells as well as between battery cell and the flexible pack. The frictionless layer has lower friction coefficient so that it can reduce the frictions acting on the surfaces of the battery cells as well as of the flexible pack. Meanwhile, the reservation region of the flexible pack may provide a free space for placing the fan-shaped end of the battery set as bending.

To achieve the abovementioned, the present invention discloses a battery container comprising a flexible pack and a battery set. The flexible pack comprises at least one accommodation region and at least one reservation region. The accommodation region and the reservation region are substantially connected to each other. The battery set is disposed in the accommodation region and comprises a plurality of battery cells, at least one frictionless layer and at least one fixing element. The battery cells are stacked and electrically connected together. Among the battery cells, at least one of the frictionless layers is disposed on the surface of the battery cell. The fixing element is used for fixing the battery cells. As the flexible pack and the battery set are bent, the end of the battery set would extend a fan-shaped end due to the different deformations of each battery cell. The reservation region is used respectively for placing the fan-shaped end of the battery set. Thus, the battery container disclosed in the present invention can improve the integrity, safety and bending ability via the frictionless layer disposed among the battery cells as well as between battery cell and the flexible pack. The frictionless layer can reduce the frictions acting on the surfaces of the battery cells as well as of the flexible pack. The reservation region of the flexible pack may provide a free space for placing the fan-shaped end of the battery set as bending.

Below, the embodiments are described in detail in cooperation with the drawings to make easily understood the technical contents, characteristics and accomplishments of the present invention.

DETAILED DESCRIPTION

Figure 1:
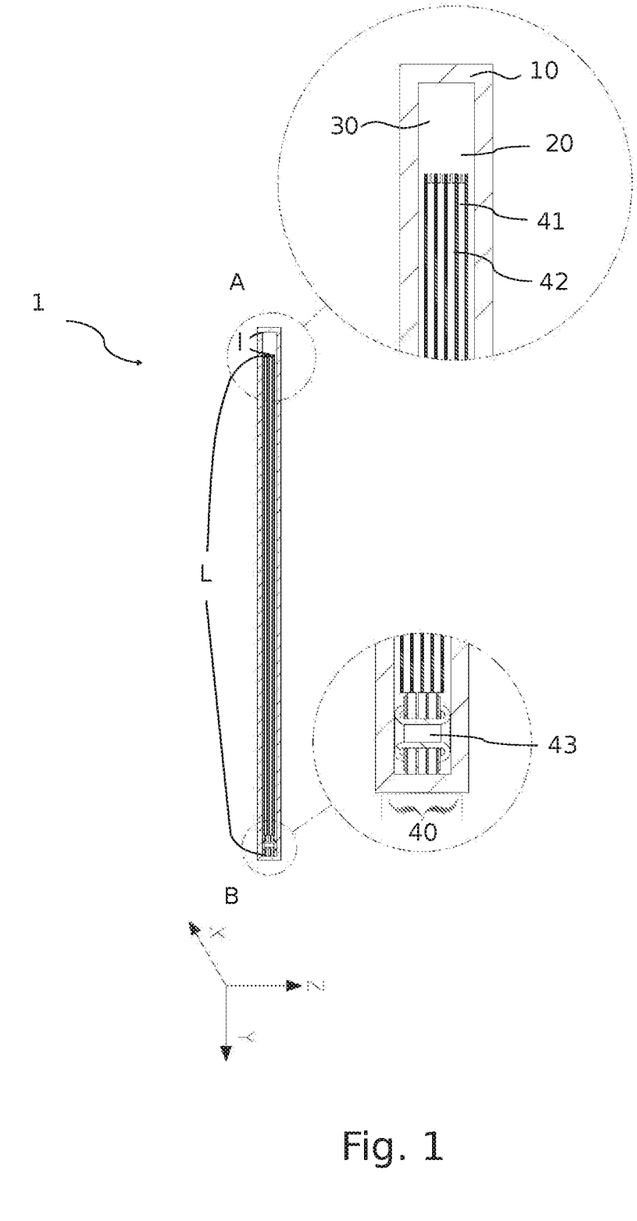
FIG. 1 is a schematic diagram of the battery container of the present invention.

Please refer to the FIG. 1 illustrating a schematic diagram of the battery container of the present invention. The battery container 1 comprises a flexible pack 10 and a battery set 40. The flexible pack 10 comprises at least one accommodation region 20 and at least one reservation region 30. The accommodation region 20 and the reservation region 30 are substantially connected together. As illustrated, the accommodation region 20 is adjacent to the reservation region 30 and the two regions 20 and 30 are connected. The battery set 40 is disposed in the accommodation region 20 and has a plurality of battery cells 41, at least one frictionless layer 42 and at least one fixing element 43. The battery cells 41 are stacked and electrically connected together. For instance, the battery cells 41 may be electrically connected in parallel, in series or the combination of the abovementioned. On one surface of at least one battery cell 41 may dispose a frictionless layer 42 to reduce the friction acting on the surface and to improve the smoothness so that the bending ability of the battery set 41 can also be improved. For different applications and designs, the frictionless layer 42 can be disposed on the surface between the two adjacent battery cells 41 and/or on the surface between the battery cell 41 and the flexible pack 10. The fixing element 43 is used to fix several battery cells 41 wherein the fixing element 43 can be selected from a rivet, a clamp and any element that can fix the stacked battery cells 41. Besides, the fixing element 43 can also be used to fix the frictionless layers 42 disposed adjacent to the battery cells 41. The end of the battery set 40 fixed via the fixing element 43 would have no deformation as bending while another free end 44 (without fixing element 43) would be deformed into a fan-shaped end due to the different deformations of each battery cell 41.

As one free end 44 of the battery set 40 is fan-shaped due to the different deformations of each battery cell 41, another end of the battery set 40 is fixed in different positions such as the right-side of the battery set 40, the left-side of the battery set 40 and the middle of the battery set 40. For instance, the battery set 40 can be fixed via the fixing element 43 in the B-end of the battery set 40 as illustrated.

Figure 2A:
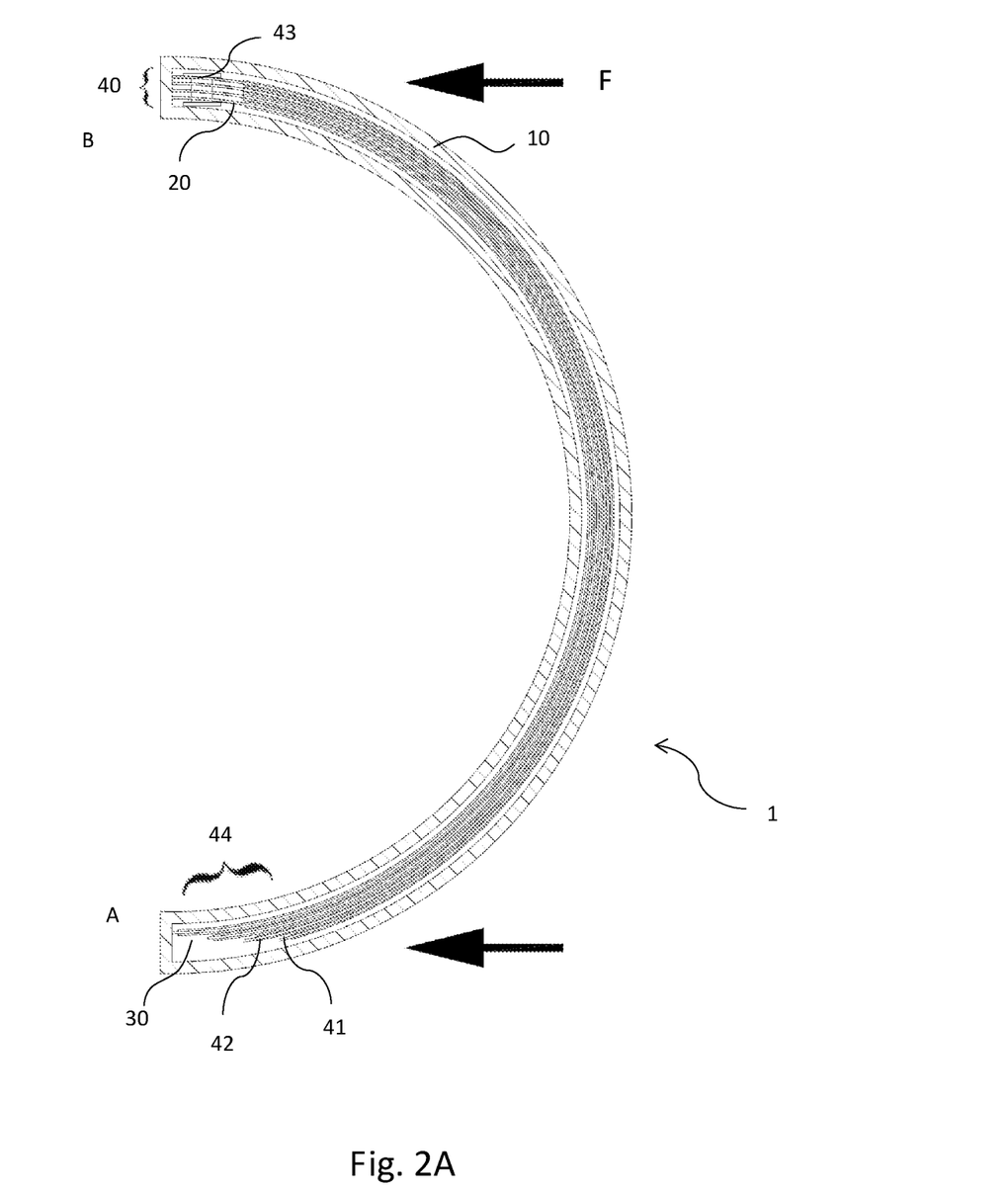
FIG. 2A is a schematic diagram of an embodiment of the bent flexible pack and the bent battery set of the present invention.

The battery set 40 is disposed in the accommodation region 20 which is connected to the adjacent reservation region 30. Thus, the battery set 40 is also adjacent to the reservation region 30. Dimensionally, as illustrated in FIG. 2A, the width-direction of the battery set 40 is parallel to the X-axis of the reservation region 30, the length-direction of the battery set 40 is parallel to the Y-axis of the reservation region 30 and the height-direction of the battery set 40 is parallel to the Z-axis of the reservation region 30. As the force F is exerted to bend the flexible pack 10 and the battery set 40, a plurality of the battery cells 41 and the frictionless layers 42 disposed between the battery cells 41 are stacked tightly and bent together. Comparing to the B-end of the battery set 40, which is fixed via the fixing element 43, the A-end of the battery set 40 becomes a fan-shaped end 44 due to the different deformations of each battery cell 41. The fan-shaped end 44 of the bent battery set 40 can be free to extend into the reservation region 30 that is adjacent to the accommodation region 20 used for disposing the battery set 40. Of course, the fan-shaped end 44 is determined via the force F exerted and/or the position that the fixing element 43. Apparently, the reservation region 30 can provide a free space for the extending fan-shaped end 44 of the bent battery set 40 so that the integrity and the safety of the bent battery set 40 can be greatly improved.

Figure 2B:
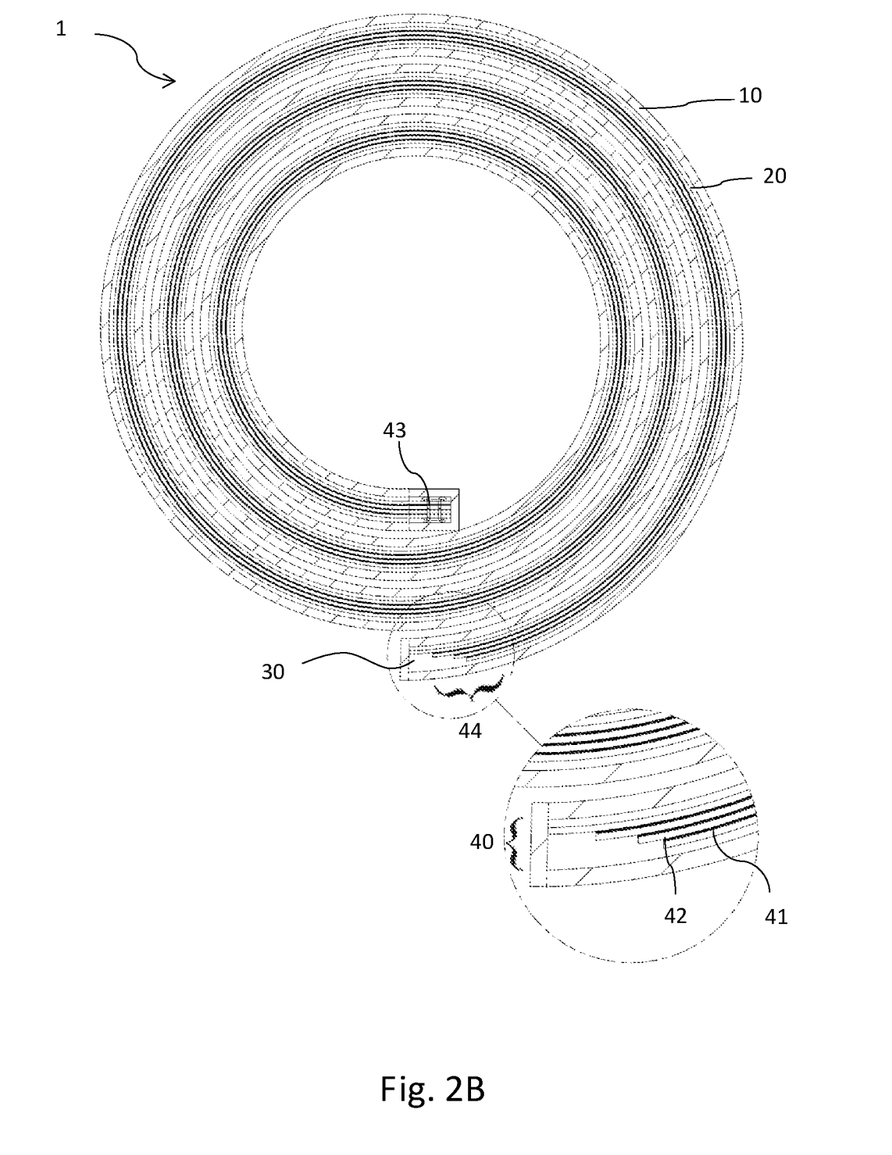
FIG. 2B is a schematic diagram of another embodiment of the bent flexible pack and the bent battery set of the present invention.

Please refer to the FIG. 1 and FIG. 2B. The flexible pack 10 and the battery set 40 can be winded coaxially. As illustrated in FIG. 2B, the flexible pack 10 and the battery set 40 are winded coaxially via a core clockwise or counter-clockwise. The fan-shaped end 44 is formed due to the different deformations of each battery cell 41 and extends into the reservation region 30 of the battery set 40. For a better design of the flexible pack 10, the ratio of the length L of the battery set 40 and the length 1 of the reservation region 30 is suggested not more than the 200.

Figure 3A:
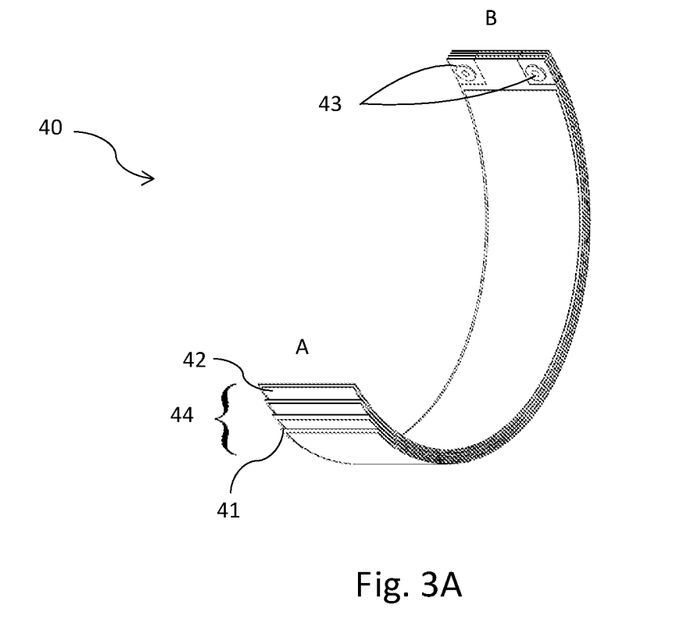
FIGS. 3A-3D are schematic diagrams of the fixing element and the fan-shaped end of the present invention.
Figure 3B:
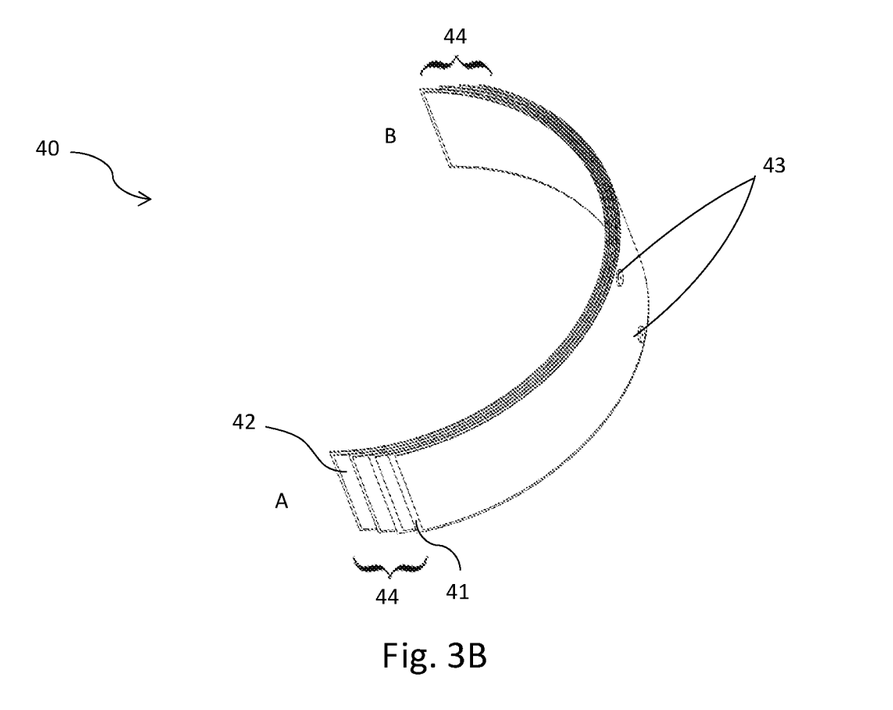
Figure 3C:
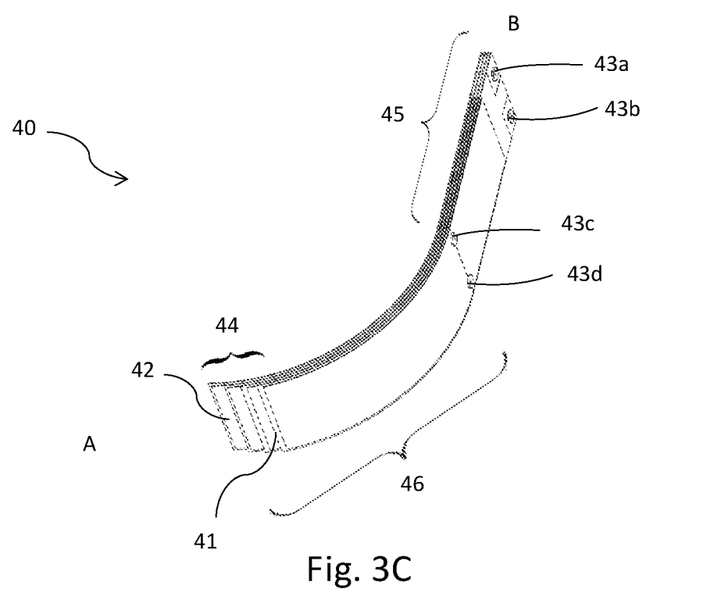
Figure 3D:
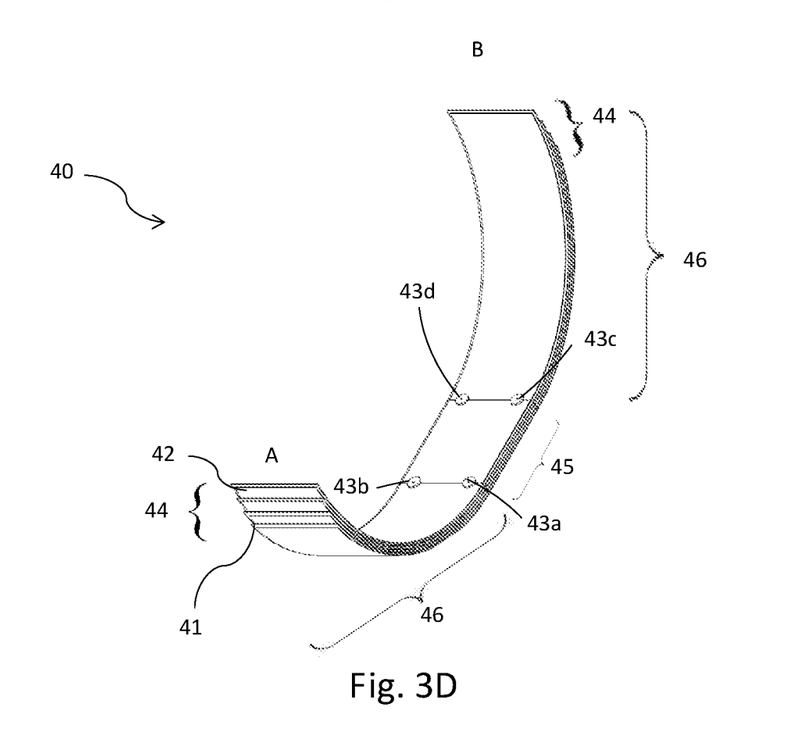

In order to decrease the inner stress of the battery container due to bending, the fixing elements 43 disposed parallel to the X-axis of the battery set 40 could be aligned and the fixing elements 43 disposed parallel to the Y-axis of the battery set 40 could be aligned. The amount of the fixing elements 43 can be adjusted according to different requirements to ensure that the battery cells 41 are fixed steadily and firmly. For instance, as the battery set 40 has shorter width, one fixing element 43 might be enough to fix the battery cells 41 steadily and firmly. As the battery set 40 has wider width, two or more fixing elements 43 might be enough to fix the battery cells 41 steadily and firmly. In FIG. 3A and FIG. 3B, the positions of the fixing elements 43 are illustrated. In FIG. 3A, the battery set 40 is fixed via two fixing elements 43 in the very end of the B-end so that the A-end of the battery set 40 would be a fan-shaped end 44 as the battery set 40 is bent. In FIG. 3B, the battery set 40 is fixed via two fixing elements 43 in the middle of the battery set 40 so that the A-end and the B-end of the battery set 40 extend into fan-shaped ends 44 respectively as the battery set 40 is bent. As for the embodiments illustrated in FIG. 3C and 3D, some examples are shown. In FIG. 3C, the battery set 40 is fixed in its B-end via the two fixing elements 43a and 43b and is fixed in the middle via another two fixing elements 43c and 43d. As the battery set 40 is bent, the battery set 40 shows a rigid part 45 and a bendable part 46, wherein the rigid part 45 seems to be flat comparing to the bendable part 46. From the embodiment illustrated, the rigid part 45 is substantially defied via the region formed via the fixing elements 43a, 43b and 43c, 43d. The rest of the region of the battery set 40 includes the bendable part 46 and the fan-shaped end 44. In FIG. 3D, the battery set 40 is fixed in its A-end via the two fixing elements 43a and 43b and is fixed in its B-end via another two fixing elements 43c and 43d. As the battery set 40 is bent, the battery set 40 shows one rigid part 45 and two bendable parts 46, wherein the rigid part 45 seems to be flat comparing to the bendable parts 46. From the embodiment illustrated, the rigid part 45 is substantially defied via the region formed via the fixing elements 43a, 43b and 43c, 43d. The bendable parts 46 include two fan-shaped ends 44 in the A-and and B-end of the battery set 40 respectively.

The flexible pack 10 further comprises a terminal 51 electrically connected to the battery set 40 and the external electrical device so that the external electrical device can be powered via the battery set 40. The terminal 51 can be a metal probe, a metal spring and so on. The external electrical device can be a lightening device, a display, a charger and so on.

Figure 4A:
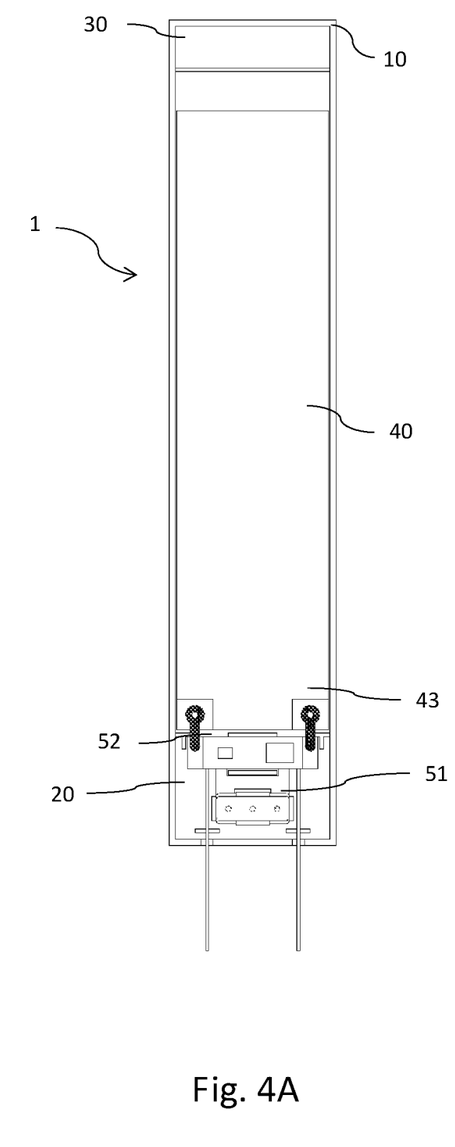
FIG. 4A is a schematic diagram of the top-view of the battery container of the present invention.
Figure 4B:
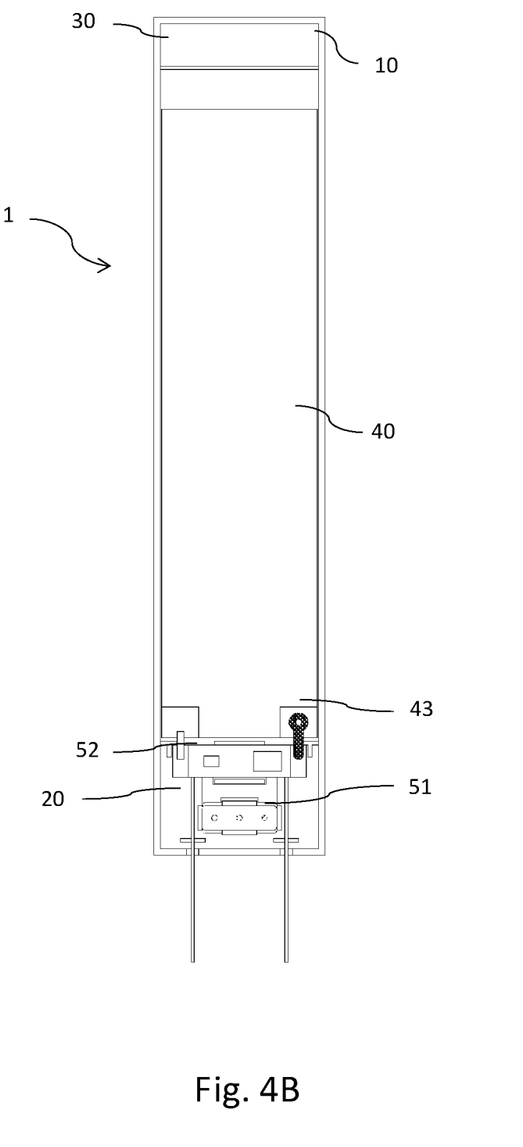
FIG. 4B is another schematic diagram of the top-view of the battery container of the present invention.

The accommodation region 20 further comprises an electrical element 52 electrically connected to the terminal 51 and the battery set 40. As the electrical element 52 is a protection circuit board, it may provide the protection for charging and discharging. In FIG. 4A and FIG. 4B, at least one of the fixing elements 43 is electrically conductive. The electrically conductive fixing element 43 may exerted for fixing the battery cells 41 and for electrically connecting the battery cells 41 in parallel and/or in series. The material of the fixing element 43 can be selected from the electrical conductive materials. In FIG. 4A, the electrical element 52 is electrically connected to the fixing element 43 and the terminal 51. In FIG. 4B, the electrical element 52 is electrically connected to the fixing element 43 and the battery set 40.

The material of the flexible pack 10 can be selected from textile, leather, polymer material, metal and a combination thereof. The outer surface of the flexible pack 10 can be designed smoothly or rough.

The material of the frictionless layer 42 is selected form the group consisting of a polystyrene-based material, a polyurethane-based material, a polyolefin-based material, a diene-type polymer, a thermoplastic rubber, thermoplastic silicon-sulfide rubber, a vinyl chloride-based material, a polyester-based material, a polyamide-based material, an organofluorine -based material, a silicone and a combination thereof.

Figure 5:
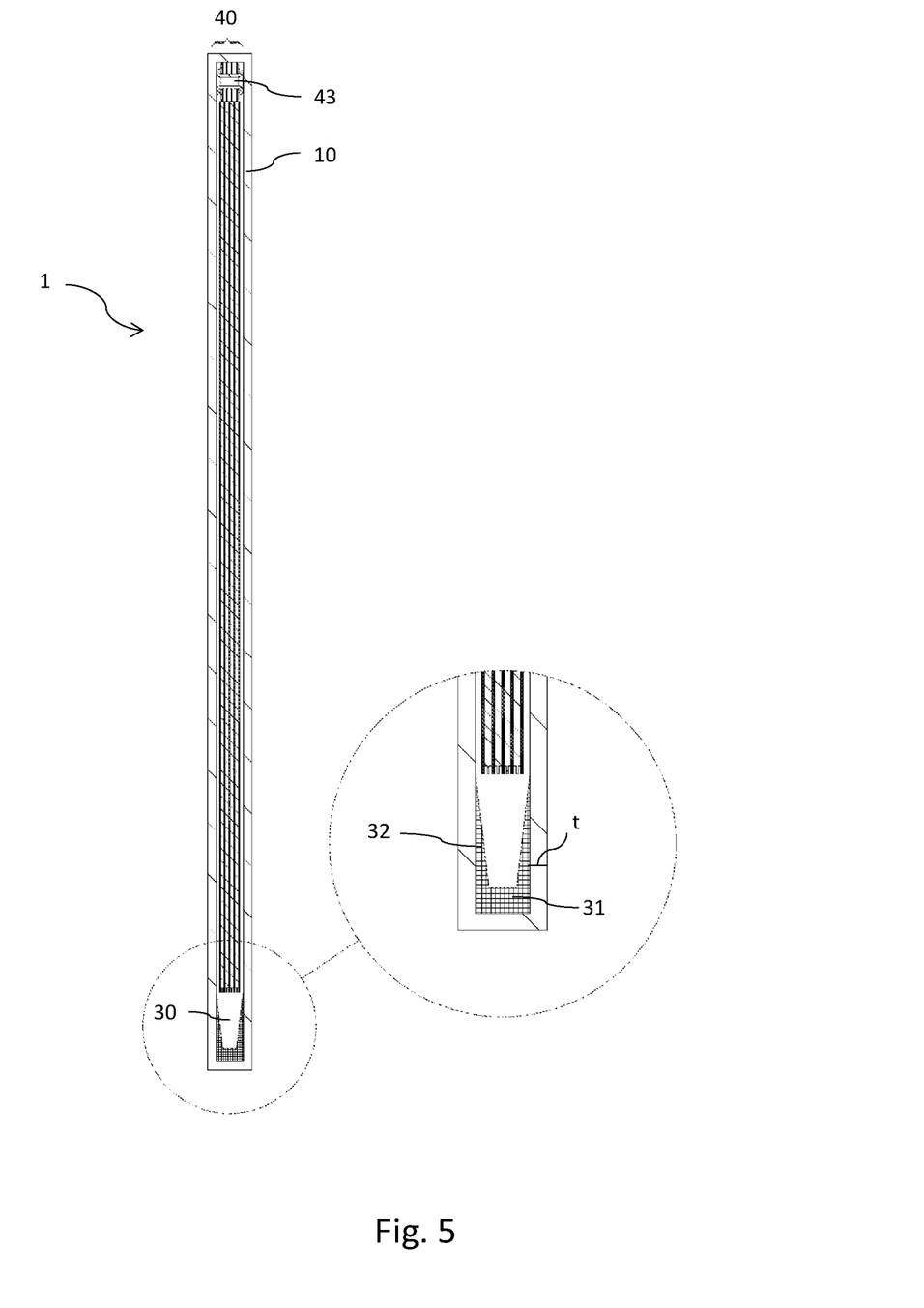
FIG. 5 is a schematic diagram of the reservation region of the battery container having a supporting element of the present invention.

The reservation region 30 has an interior open end connecting to the accommodation region 20 and an exterior closed end, and can be evacuated. The vacuum can be created via purging or vacuuming. The reservation region 30 can be filled with at least one kind of fluids such as gas, plastic material and so on. The plastic material (ex. clay, wax and so on) can be disposed in the reservation region 30 before placing the battery set 40 in to the accommodation region 20 so that the space of the reservation region 30 can be filled by the plastic material. As the battery set 40 is bent, the plastic material disposed inside the reservation region 30 can be deformed into the extended fan-shaped end 44. The reservation region 30 further comprises a supporting element 31 to maintain the flexible pack 10 in a certain shape. The supporting element 31 can be an element having an opening such as in the shape of ⊏, V, U and so on. The supporting element 31 further comprises at least one inclined plane so that the end of the battery set 40 can be slide into the reservation region 30 easier. As illustrated in FIG. 5, the supporting element 31 has a first inclined plane 32 and a second inclined plane 32 disposed on side portions thereof. The first and second inclined planes 32 are formed on side portions of the supporting element 31 proximate the exterior closed end thereof and both taper down toward the interior open end of the reservation region 30. The first and second inclined planes 32 are helpful for guiding the battery set 40 to slide into the reservation region 30 easier. Please refer to FIG. 5, the fan-shaped end 44 of the bent battery set 40 slides into the reservation region 30 via the inclined plane 32. The difference is that the flexible pack 10 is thinner with the thickness of t so that the supporting element 31 is suggested to be reinforced in this case. For instance, the flexible pack 10 with a 0.2 mm-thickness is suggested to include supporting element 31 to maintain the integrity of the reservation region 30.

The battery container disclosed in the present invention can improve the integrity, safety and bending ability via the frictionless layer disposed among the battery cells as well as between battery cell and the flexible pack. The frictionless layer can reduce the frictions acting on the surfaces of the battery cells as well as of the flexible pack. The reservation region of the flexible pack may provide a free space for placing the fan-shaped end of the battery set as bending.

What is claimed is:

1. A battery container, comprising:
    (a) a flexible pack that comprises:
        an elongated accommodation region defined within the flexible pack and terminating on respective ends thereof in first and second reservation regions which each have an interior open end connecting to the elongated accommodation region and an exterior closed end;
        a supporting element disposed within the first reservation region proximate the exterior closed end thereof and having on side portions thereof a first inclined portion and a second inclined portion that both taper down toward the interior open end of the first reservation region; and
        a terminal disposed within the second reservation region proximate the exterior closed end thereof;
    (b) a battery set that is bent, that is disposed within the elongated accommodation region, that has two ends having respective shapes, one end being electrically connected to the terminal within the second reservation region, and another end forming a fan-shaped end as bent and being disposed within the first reservation region, and that comprises:
        a plurality of battery cells that are stacked and that are electrically connected to each other;
        at least one friction-reducing layer that is disposed on at least one surface of each battery cell of the plurality of battery cells; and
        at least one fixing element that fixes the plurality of battery cells to one another, and
    (c) an electrical element disposed within the second reservation region proximate the terminal, the electrical element being a protection circuit board providing protection for charging and discharging, and being electrically connected to the terminal of the flexible pack and to the battery set.

2. The battery container as claimed in claim 1, wherein the at least one fixing element is electrically conductive.

3. The battery container as claimed in claim 1, wherein the electrical element is electrically connected either (a) to the fixing element and to the terminal or (b) to the fixing element and to the battery set.

4. The battery container as claimed in claim 1, wherein the at least one friction-reducing layer is disposed between two adjacent battery cells of the plurality of battery cells.

5. The battery container as claimed in claim 1, wherein the at least one friction-reducing layer is disposed between the flexible pack and an adjacent battery cell of the plurality of battery cells.

6. The battery container as claimed in claim 1, wherein the flexible pack comprises a material that is selected from the group consisting of a textile, leather, a polymer material, a metal and a combination thereof.

7. The battery container as claimed in claim 1, wherein the at least one fixing element is either (a) a fixing rivet or a clamp or (b) the fixing rivet and the clamp.

8. The battery container as claimed in claim 1, wherein the at least one friction-reducing layer comprises a material that is selected form the group consisting of a polyurethane-based material, a polyolefin-based material, a thermoplastic rubber, a polyester-based material, a polyamide-based material and a combination thereof.

9. The battery container as claimed in claim 1, wherein the at least one reservation region is evacuated.

10. The battery container as claimed in claim 1, wherein the first and second reservation regions are filled with a fluid.

11. The battery container as claimed in claim 1, wherein a ratio of the length of the battery set and the length of the least one reservation region is not more than 200.

12. The battery container as claimed in claim 1, further comprising a plurality of battery sets that are electrically connected either (a) in parallel or in series or (b) in parallel and in series.

13. The battery container as claimed in claim 1, wherein the flexible pack is an integrated body.

14. The battery container as claimed in claim 2, wherein the electrical element is electrically connected either (a) to the fixing element and to the terminal or (b) to the fixing element and to the battery set.

15. The battery container as claimed in claim 1, wherein the at least one reservation region is filled with a plastic material.

16. The battery container as claimed in claim 7, wherein the at least one fixing element is a fixing rivet that fixes the plurality of battery cells and the at least one friction reducing layer, that is electrically conductive, and that connects the plurality of battery cells in series.

\* \* \* \* \*